Sept. 14, 1943.  J. A. VAUGHAN  2,329,683
VARIABLE RATIO GEARING
Filed April 15, 1942
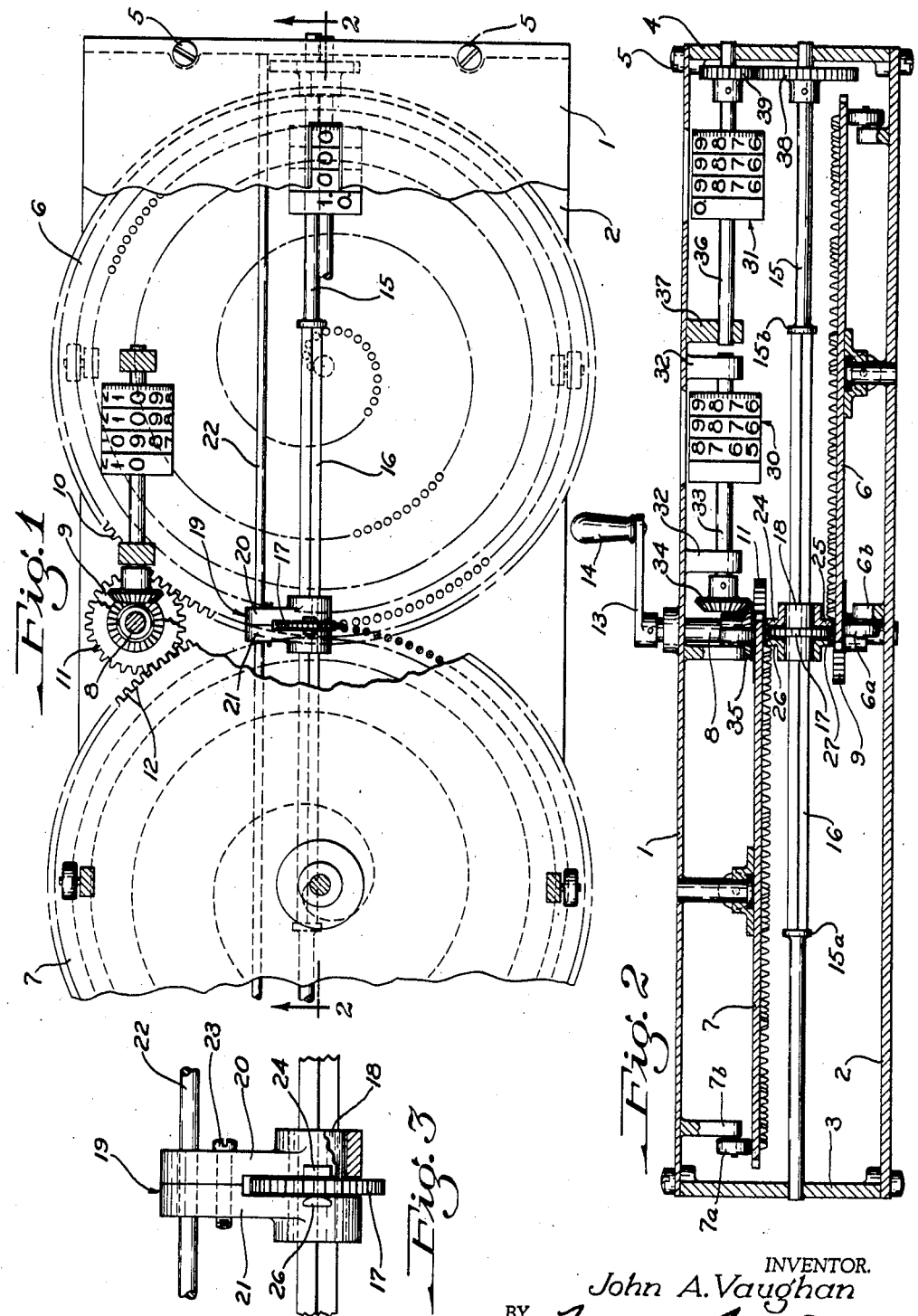
INVENTOR.
John A. Vaughan
BY Moses & Nolte
ATTORNEYS.

Patented Sept. 14, 1943

2,329,683

UNITED STATES PATENT OFFICE 2,329,683

VARIABLE RATIO GEARING

John A. Vaughan, Hempstead, N. Y., assignor, by mesne assignments, to Reconstruction Finance Corporation, New York, N. Y., a corporation of the United States Application April 15, 1942, Serial No. 438,981

7 Claims. (Cl. 74—424.5)

This invention relates to variable ratio gearing, and is in the nature of an improvement upon the inventions of William L. Maxson and Peter J. McLaren disclosed and claimed in their pending application Serial No. 371,740, filed December 26, 1940, for Variable ratio gearing, and their U. S. Patent No. 2,273,652, granted February 17, 1942, for Mathematical apparatus.

In accordance with the prior inventions referred to a flat gear is provided having teeth arranged upon a spiral path for driving an output or follower gear, the arrangement being such that rotation of the gear through an angle which is a definite multiple of a basic input angle produces at all times an output through the follower gear which is a fixed multiple of the sine or cosine of the basic angle, depending upon the point at which the operation is begun and the direction of rotation of the gear. A single gear is adapted by its unidirectional rotation to cover a range of one quadrant of the basic angle.

Gears of this kind have many uses, for example, in navigation machines and in range finders. In some uses it is necessary that the mechanism be able to deal with either positive or negative angles, and with angles whose value exceeds two right angles. In other instances the total range of the apparatus is greater than one right angle but is not greater than two right angles.

In the former case it has been necessary, as disclosed in Patent No. 2,273,652 to provide automatically for reversal of the direction of gear input at the end of every quadrant, and to provide for the reversal of gear output at the ends of alternate quadrants. In the latter case it has been necessary to provide for input reversal at the end of the first quadrant where a sine output is required, and to provide for both input and output reversal at the end of the first quadrant where a cosine output is required. The primary object of the present invention is to provide a combination of gears of the kind referred to which will admit of continuous operation throughout a range of two quadrants of the basic angle without any reversing mechanism whatever, and which will admit of continuous operation through more than two quadrants subject only to a reversal of both input and output at the end of each two-quadrant intervals. In one instance the need for reversing mechanism is eliminated altogether, while in the other the structure and the operation of the reversing mechanism may be considerably simplified, and the reversing operations substantially reduced in number.

To these ends, it is a feature of the invention that two spiral gears are arranged in marginally overlapped, confronting relation, to extend substantially tangent to the path of a common output gear which is interposed between them, and that means are provided for driving the two variable radius gears in common, and in unison with one another.

Provision is desirably made of guide means cooperative with the follower gear and with the spirally arranged teeth of the variable radius gears to cause the follower gear to be driven axially of an output shaft upon which it is mounted, by the spirally arranged teeth of the variable radius gears, and to cause the follower gear to be transferred smoothly from the control of the teeth of one variable radius gear to the teeth of the other when the outermost teeth of the two gears run simultaneously in mesh with the follower gear.

By virtue of this arrangement the follower gear may be operated from the inner end to the outer end of the spiral of one of the variable radius gears through a first quadrant, and then operated from the outer end to the inner end of the spiral of the other variable radius gear through a second quadrant, without resort to the employment of any reversing mechanism whatever.

A counter properly geared to the output shaft may be caused constantly to register the correct value of the cosine of the basic angle throughout the described operation by setting it initially to read +1. If the counter, on the other hand, is set to read zero when the outermost teeth of the two gears engage the output gear, operation of the gears in one direction will produce a correct sine output throughout the first positive quadrant, and rotation of the gears in the reverse direction will then continuously produce correct sine outputs as the angular value returns to zero and then progressively changes to —90°. In other words, for either sine or cosine output the gear combination can be operated continuously through a range of two quadrants of basic angle without any reversal having to be effected.

Other objects and advantages will hereinafter appear.

In the drawing forming part of this specification:

Fig. 1 is a plan view partly broken away of a practical and advantageous device which embodies the invention;

Fig. 2 is a vertical, sectional view taken on the line 2—2 of Fig. 1 looking in the direction of the arrows; and Fig. 3 is a fragmentary, detail view of the output gear, the output shaft and the guide means for the output gear.

The illustrative embodiment of the invention comprises a frame which includes upper and lower frame plates 1 and 2, the plates being secured to end blocks 3 and 4 by means of suitable screws 5. A flat, variable radius gear 6 is pivotally mounted in the plate 2 with the teeth thereof facing upward, and a flat variable radius gear 7 is revolubly mounted in the plate 1 with the teeth thereof facing downward. The gears are arranged in confronting, marginally overlapped, parallel relation, and with their axes at such distance from one another that the centers of the outermost teeth of the two gears run in circular paths which are substantially tangent to a common plane.

The gear 7 is marginally engaged and guided by rollers 7a, mounted on posts 7b which are affixed to plate 1. The gear 6 is marginally engaged and guided by rollers 6a, mounted on posts 6b which are affixed to plate 2.

A vertical shaft 8, journaled in the plates 1 and 2, has affixed to it a lower pinion 9 in mesh with gear teeth 10 of the gear 6, and an upper pinion 11 in mesh with teeth 12 of the gear 7. The shaft 8 may be driven in any suitable manner, and is illustrated as being provided with a crank arm 13 having a crank handle 14 upon it. The shaft 8 always drives the gears 6 and 7 in unison with one another, and in the opposite direction to that in which it is, itself, rotated.

An output shaft 15 is revolubly supported in the blocks 3 and 4 with its axis extending parallel to the plane in which the axes of both gears 6 and 7 lie, and at a short distance from such plane. A portion 16 of the shaft 15 between the blocks 3 and 4 is made non-circular in cross-section, being illustrated as square. An output gear 17, whose hub portion 18 is formed internally to fit the non-circular portion of shaft 16, is mounted slidingly on the shaft 15, and is adapted to mesh with, and to be driven by, the spirally arranged teeth either of the gear 6 or of the gear 7. The output gear 17 is constrained to rotate in unison with the output shaft 15, but is capable of linear traverse axially of the shaft.

Guide means 19 is provided in association with the output gear 17 for cooperation with the output gear and with the spirally arranged teeth of the gears 6 and 7 to cause the output gear to be driven axially of the shaft 15 by the spirally arranged teeth of the gears 6 and 7. The guide means 19 comprise a pair of blocks 20 and 21, slidingly mounted upon a supporting rod 22 which extends parallel to the shaft 15, and which is supported in the blocks 3 and 4. The block 20 fits onto the cylindrical exterior of the hub 18 of gear 17 at one side, and the block 21 fits on the cylindrical exterior of the hub of gear 17 at the other side of the gear. The blocks 20 and 21 are firmly secured to one another by means of a screw 23.

It will be evident that the guide means 19 embrace the gear 17 so that the gear and the guide means are compelled to travel in unison with one another axially of the shaft 15. The guide means 19 is held against rotation by the rod 22 in cooperation with the hub 18 of the gear 17.

The block 20 is formed with upper and lower guiding projections or pins 24 and 25, and the block 21 is formed with upper and lower guiding projections or pins 26 and 27. The projections 25 and 27 are adapted to embrace the spiral tooth track of the lower gear 6, and the projections 24 and 26 are adapted to embrace the spiral tooth track of the gear 7. The projections 24 and 27 lie at the outer sides of the spirals engaged by them, and they may be segments of substantial extent. The projections 25 and 26 lie at the inner sides of the spirals engaged by them, and are desirably in the form of fingers of limited width as disclosed in Serial No. 371,740.

As illustrated in Fig. 1 the gears 6 and 7 are being turned or are about to be turned in a counter-clockwise direction, by clockwise rotation of the shaft 8 and the crank 13. This will carry the outermost tooth or teeth of gear 6 out of mesh with the lower side of gear 17, and will cause the gear 17 to be driven rotatively by the teeth of gear 7 and also through the cooperative action of the guide means 19 to be driven axially of the shaft 15 toward the left, to traverse the entire spiral track of the gear 7.

If clockwise rotation of the shaft 15, as viewed from the right in Figs. 1 and 2, be considered positive, and if counters of proper ratio be geared to the shafts 8 and 15, the operation just described may constitute the running in of the basic angle for the first positive quadrant. The counter driven by the shaft 8 will continuously indicate the value of the angle and the counter driven by the shaft 15 will continuously indicate the sine of the angle.

At the conclusion of the operation which has been referred to it is necessary to reverse the direction of rotation of the shaft 8 and of the gears 6 and 7, by turning the crank 13 in the opposite direction. As the input angle is thus caused to diminish, the sine output is caused correspondingly to diminish until the original condition illustrated in Fig. 1 is reattained. Continuation of the rotation of the shaft 8 in a counter-clockwise direction will cause control of the output gear 17 and the guide means 19 to be taken over by the spirally arranged teeth of the gear 6, and this operation may be continued until the output gear 17 reaches substantially the center of the gear 6. This operation runs in the basic angle for the first negative quadrant, causing it to be indicated continuously on the counter operated by shaft 8, and it runs in the sine for the first negative quadrant causing it to be indicated continuously by the counter which is operated by the shaft 15.

Stop shoulders 15a and 15b are provided on shaft 15 at the ends of the operative path of the gear 17 and the guide 19 to limit the operation by engagement with the guide 19.

The gears 6 and 7 are, of course, harmoniously adjusted in phase. The curvature of the spiral tracks is least at the outermost teeth and hence the conditions are most favorable for the smooth and uninterrupted transfer of the gear 17 and the guide means 19 from the control of one of the variable radius gears to the control of the other. The change of radius is so slight that a few extra pins may be provided on the gears 6 and 7 to cause a slight overlap of engagement of the teeth of gears 6 and 7 with gear 17.

The gears may be used either as sine gears or as cosine gears. Since $\cos x = \sin(90+x)$, the gear operation would be the same in either case, the only difference being the setting of the input counter relative to the gears 6 and 7.

The gears are duplicates of one another, and each gear may be of the exact construction disclosed in connection with Fig. 1 of Serial No. 371,740. The axis of the output shaft 15 is displaced from the plane which includes the axes of both the gears 6 and 7 in accordance with the disclosure of Serial No. 371,740, and for the reasons clearly pointed out therein.

As shown herein, a counter 30 is driven from the shaft 8 to indicate the angular input and a counter 31 is driven from the shaft 15 to indicate the functional output. Bearing posts 32 carried by the plate 1 revolubly support a shaft 33. The counter 30 is supported upon and driven from the shaft 33. A bevel gear 34 fast on the shaft 33 is driven from a bevel gear 35 fast on the shaft 8.

A shaft 36 is revolubly mounted in the end block 4 and in a bearing post 37 carried by plate 1. The counter 31 is supported by and driven from the shaft 36. The shaft 36 is driven from shaft 15 through a gear 38 fast on the shaft 15, and a meshing gear 39 fast on the shaft 36.

I have described what I believe to be the best embodiments of my invention. I do not wish, however, to be confined to the embodiments shown, but what I desire to cover by Letters Patent is set forth in the appended claims.

I claim:

1. Variable ratio gearing comprising, in combination, a pair of flat driving gears having teeth arranged in spiral paths on their faces, means revolubly supporting said gears in parallel, marginally overlapped, confronting relation, input means for driving said gears in unison, and an output shaft disposed to extend midway between said driving gears parallel to the gear faces and in the direction of the plane which includes the axes of both the driving gears, a common driven output gear mounted on the output shaft constrained to rotate in unison therewith, and adapted to mesh with the spirally arranged teeth of either gear or with the outermost teeth of both of them simultaneously, the teeth of the two driving gears having their outermost teeth located to travel substantially tangent to a common plane so that the follower gear can run smoothly off the end of one spiral track and onto the end of the other.

2. Variable ratio gearing comprising, in combination, a pair of flat driving gears having teeth arranged in spiral paths on their faces, means revolubly supporting said gears in parallel, marginally overlapped, confronting relation, input means for driving said gears in unison, and an output shaft disposed to extend midway between said driving gears parallel to the gear faces and in the direction of the plane which includes the axes of both the driving gears, a common driven output gear mounted on the output shaft constrained to rotate in unison therewith, and adapted to mesh with the spirally arranged teeth of either gear or with the outermost teeth of both of them simultaneously, and guide means cooperative with the follower gear and the spirally arranged teeth of the driving gears to cause the follower gear to be driven axially of the output shaft by the spirally arranged teeth of first one driving gear and then the other.

3. Variable ratio gearing comprising, in combination, an output shaft, an output gear mounted on said shaft and constrained for rotation in unison with the shaft but capable of linear traverse axially of the shaft, a pair of variable radius input gears each having spirally arranged teeth, said input gears disposed to mesh with the output gear at opposite sides of the output shaft axis, means for driving the input gears in unison, and means cooperative with the input gears and the output gear for causing the output gear to be driven axially of the output shaft by the teeth of said input gears.

4. Variable ratio gearing as set forth in claim 2 in which the axis of the output shaft extends parallel to the plane which includes the axes of both the driving gears at a short distance from such plane.

5. Variable ratio gearing as set forth in claim 1 in which a guide means is included which embraces the follower gear and includes two diametrically opposed pairs of fingers, said pairs of fingers being cooperative respectively with the spirally arranged teeth of the respective driving gears, and in which a support for the guide means is provided for preventing rotation of the guide means while permitting bodily traverse thereof with the output gear.

6. Variable ratio gearing as set forth in claim 1 in which a guide means is included which embraces the follower gear and includes two diametrically opposed pairs of fingers, said pairs of fingers being cooperative respectively with the spirally arranged teeth of the respective driving gears, and in which a supporting rod is mounted to extend parallel to the output shaft axis, on which the guide means is slidingly mounted.

7. Variable ratio gearing comprising, in combination, a plurality of input gears each having teeth arranged in a spiral path, a follower output gear adapted to be driven uninterruptedly by the input gears one after another, and means for guiding the follower gear in a rectilinear path first across a portion of the toothed face of one of the input gears and thence across a portion of the toothed face of another of the input gears.

JOHN A. VAUGHAN.